United States Patent
Wilksch

Patent Number: 5,339,785
Date of Patent: Aug. 23, 1994

[54] AUTOMOTIVE FUEL SUPPLY APPARATUS AND CONTROL VALVE

[75] Inventor: Mark Wilksch, Buckingham, United Kingdom

[73] Assignee: Ford Motor Company, Dearborn, Mich.

[21] Appl. No.: 72,011

[22] Filed: Jun. 7, 1993

[30] Foreign Application Priority Data

Jun. 29, 1992 [GB] United Kingdom ............. 9213746.2

[51] Int. Cl.5 ............................................. F02M 37/04
[52] U.S. Cl. ..................................... 123/457; 123/467; 123/497; 137/568
[58] Field of Search ............... 123/456, 457, 459, 514, 123/497, 509, 510, 463, 459; 137/493.3, 496, 568, 542

[56] References Cited

U.S. PATENT DOCUMENTS

| | | |
|---|---|---|
| 3,820,517 | 6/1974 | Nambu . |
| 3,930,519 | 1/1976 | Byrd ..................... 137/505.25 |
| 4,205,648 | 6/1980 | Graham . |
| 4,246,876 | 1/1981 | Bouwkamp et al. ................ 123/467 |
| 4,248,194 | 2/1981 | Drutchas et al. .................... 123/497 |
| 4,431,026 | 2/1984 | Fehrenbach ......................... 137/568 |
| 4,628,957 | 12/1986 | Höfer et al. ........................ 137/493.3 |
| 4,646,706 | 3/1987 | Emmenthal ........................... 123/463 |
| 4,649,884 | 3/1987 | Tuckey ................................ 123/457 |
| 4,664,142 | 5/1987 | Bertsch et al. ..................... 137/568 |
| 4,729,360 | 3/1988 | Fehrenbach et al. . |
| 4,756,291 | 7/1988 | Gummins et al. ................... 123/497 |
| 4,800,859 | 1/1989 | Sagisaka et al. .................... 123/497 |
| 4,872,437 | 10/1989 | Asayama .............................. 123/463 |
| 4,940,034 | 7/1990 | Heim et al. ........................... 123/497 |
| 4,964,391 | 10/1990 | Hoover ................................ 123/510 |
| 5,012,785 | 5/1991 | Long et al. .......................... 123/506 |
| 5,092,302 | 3/1992 | Mohan ................................. 123/497 |
| 5,148,792 | 9/1992 | Tuckey ................................ 123/497 |
| 5,195,493 | 3/1993 | Re ....................................... 123/510 |
| 5,195,494 | 3/1993 | Tuckey ................................ 123/514 |
| 5,237,975 | 8/1993 | Betki et al. ......................... 123/497 |

FOREIGN PATENT DOCUMENTS

| | | |
|---|---|---|
| 0299337A2 | 1/1989 | European Pat. Off. . |
| WO82/0409 | 11/1982 | PCT Int'l Appl. . |
| 563672 | 8/1944 | United Kingdom . |
| 1155285 | 6/1969 | United Kingdom . |
| 1379892 | 1/1975 | United Kingdom . |

Primary Examiner—Carl S. Miller
Assistant Examiner—Thomas N. Moulis
Attorney, Agent, or Firm—Jerome R. Drouillard; Roger L. May

[57] ABSTRACT

A fuel delivery arrangement for a fuel injected engine 12 has a single fuel line 16 extending from an in-tank fuel pump 14 to a fuel rail 18. Included within the fuel line 16 is a check valve 24 which allows fuel flow from the tank to the fuel rail but which prevents return flow while allowing any trapped fuel between the fuel rail and the check valve to expand to reduce pressure.

7 Claims, 3 Drawing Sheets

AUTOMOTIVE FUEL SUPPLY APPARATUS AND CONTROL VALVE

FIELD OF THE INVENTION

This invention relates to a fuel supply arrangement for use with an automotive engine which has a fuel injection system. More specifically, this invention relates to a pressure control valve for maintaining an acceptable pressure to a fuel injection system.

BACKGROUND OF THE INVENTION

In fuel injected engines, it is essential to ensure that the pressure of fuel delivered to the injectors is accurately controlled so that each time an injector opens the desired quantity of fuel is forced through the injector nozzles into the cylinders of the engine.

In order to ensure that the correct fuel pressure is obtained, it is conventional to supply the injectors with fuel from a fuel rail, and for the fuel rail to be connected to the fuel tank through feed and return passages. The fuel pump operates continuously, at a constant rate and pumps more fuel per unit time to the rail than is required. The excess fuel is returned to the tank through the return line. A pressure regulator is conventionally incorporated in or near the fuel rail.

Proposals have been made to operate fuel injection systems with only one fuel pipe leading between the fuel tank and the fuel injectors at the engine. Such systems are conventionally known as 'returnless' fuel systems. The fuel pump in such a system will operate in accordance with engine demand and under certain conditions (e.g., deceleration) will stop running and the injectors will be closed. It is important then that the correct fuel system operating pressure is maintained at the injectors so that when demand returns and the injectors are operated, fuel at the correct pressure is present at the injectors.

In order to maintain this pressure, a check valve can be provided in the fuel line, as described in U.S. Pat. No. 4,964,391. However the volume of fuel trapped between the check valve and the injectors can be subject to external influences, for example temperature changes, which will alter the pressure under which the trapped volume is held. Such changes are undesirable.

SUMMARY OF THE INVENTION

According to the present invention there is provided a fuel delivery arrangement for an internal combustion engine, the arrangement comprising a fuel reservoir, a pump, a fuel line along which fuel from the reservoir is pumped to the engine and a check valve in the fuel line, the check valve having a valve member movable relative to a valve body to open and close a valve opening, the valve being arranged to open to permit fuel flow to the engine when the pressure on the reservoir side of the valve is greater than the pressure on the engine side and to close when the pressure differential is reversed, and wherein the valve member is able to continue to move after having closed the valve opening in order to maintain the pressure of the fuel volume enclosed between the valve member and the engine.

The ability of the valve member to continue to move after closing the flow passage allows pressure variations (in both directions) to be accommodated in the volume of fuel trapped between the valve and the engine, so that the pressure behind the injectors remains within a desired range.

The valve member may be in the form of a piston travelling in a cylindrical chamber with one of the fuel line connections to the chamber intermediate the ends of the chamber so that the valve member closes communication between the connections before it reaches the end of its travel in the chamber. The valve member can include a nonreturn valve operating in a direction opposite to that of the check valve and adapted to open at a pressure substantially higher than the opening pressure of the check valve.

Alternatively, the valve member may comprise a closure member supported on a diaphragm, with the diaphragm being free to distend after the closure member has closed on a valve seat, in order to increase the volume enclosed between the valve member and the engine.

The arrangement may comprise only a single fuel line between the engine and the fuel tank, in which line the check valve is fitted, and means for controlling the operation of the pump in accordance with engine operating parameters such as throttle pedal position, fuel temperature or intake manifold vacuum.

According to another aspect of the invention, there is provided a fuel delivery arrangement for an internal combustion engine, the arrangement comprising a fuel reservoir, a fuel pump, a fuel line along which fuel from the reservoir is pumped to the engine, a check valve in the fuel line, the check valve having a valve member movable relative to a valve body to open and close a valve opening, and means for controlling operation of the pump to vary the delivery of the pump in dependence on engine operating parameters, wherein the check valve is arranged to open to permit fuel flow to the engine when the pressure on the reservoir side of the valve is greater than the pressure on the engine side and to close when the pressure differential is reversed, and wherein the valve member is able to continue to move after having closed the valve opening in order to maintain the pressure of the fuel volume enclosed between the valve member and the engine.

DETAILED DESCRIPTION OF THE PREFERRED EMBODIMENT

Figure 1:
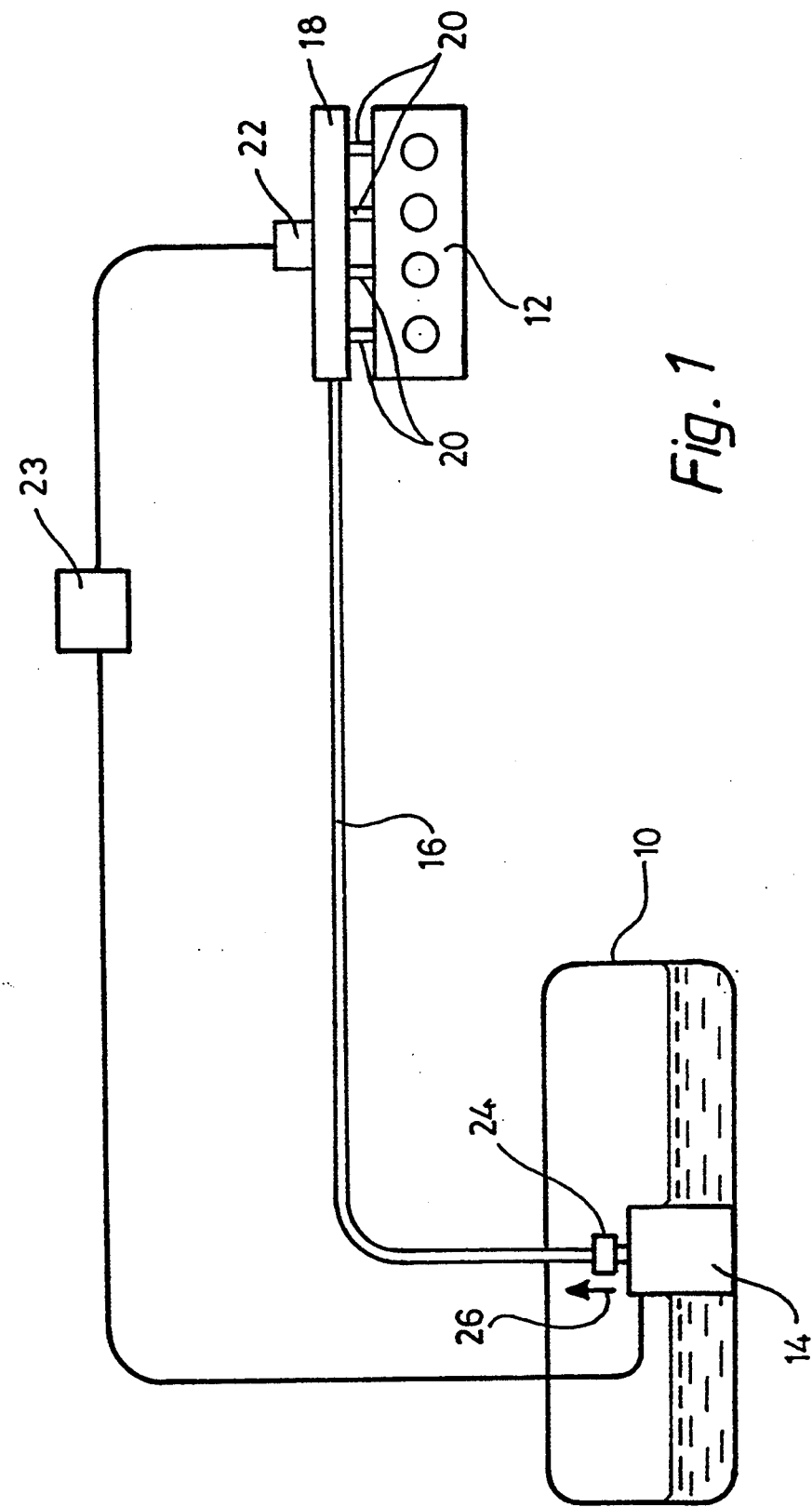
FIG. 1 is a schematic view of a fuel delivery arrangement in accordance with the invention.

FIG. 1 shows a schematic arrangement in which fuel is delivered from a fuel tank 10 to an engine 12. A pump 14 is housed within tank 10 and draws fuel from tank to pass it along a fuel line 16 leading to a fuel rail 18. From fuel rail 18, fuel is injected into the cylinders of the engine (four cylinders in the scheme shown in FIG. 1) through respective injectors 20. The arrangement includes a pressure transducer 22 which senses the pressure in the line 16 and passes a signal to an electronic pump speed control module 23 which controls the operation of pump 14, and a check valve 24. Valve 24 can be fitted at various positions in line 16. In FIG. 1, valve 24 is shown at a position just downstream of pump 14, but other positions are possible. For example, valve 24 could be fitted within the housing of pump 14, or it could be fitted closer to the engine. The preferred position is, however, in close association with tank 10.

It is important to ensure that the pressure maintained within fuel rail 18 is maintained within the desired limits whatever the speed of the engine. As the engine speed varies, so will the rate of fuel consumption and consequently also the rate of delivery from pump 14.

During normal operation, valve 24 will be opened by the fuel pressure generated by pump 14 to allow flow to fuel rail 18 in the direction indicated by the arrow 26. There will however be occasions when the pressure in fuel rail 18 is above the desired level, for example when the engine speed suddenly drops if the driver takes his foot off the accelerator. In such a case, it will become necessary to relieve the pressure, and check valve 24 is constructed in order to allow this to happen.

Figure 2:
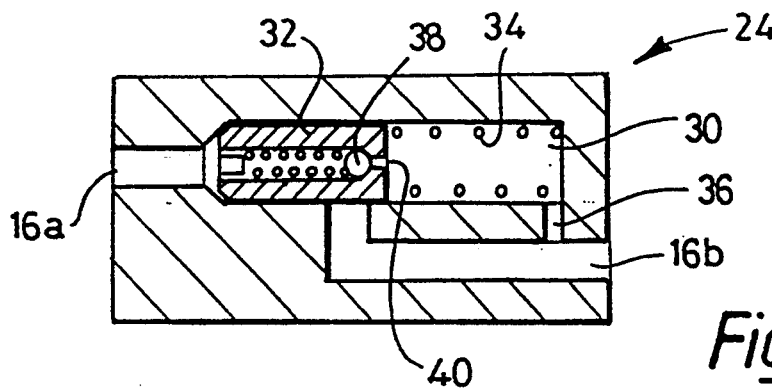
FIG. 2 shows the control valve in a closed position which does not allow flow through the valve or further expansion of the valve member to take up excess pressure.
Figure 3:
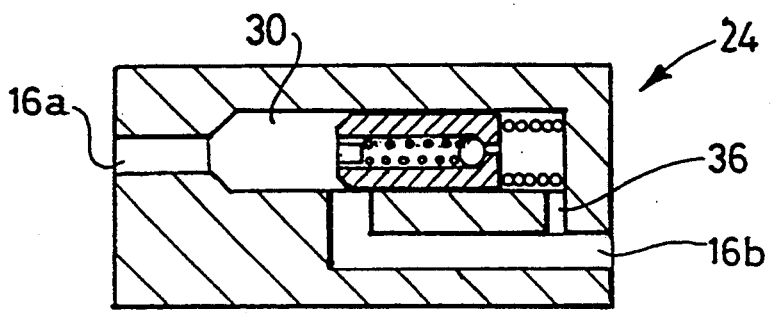
FIG. 3 shows the control valve member in the normal fuel supply position.
Figure 4:
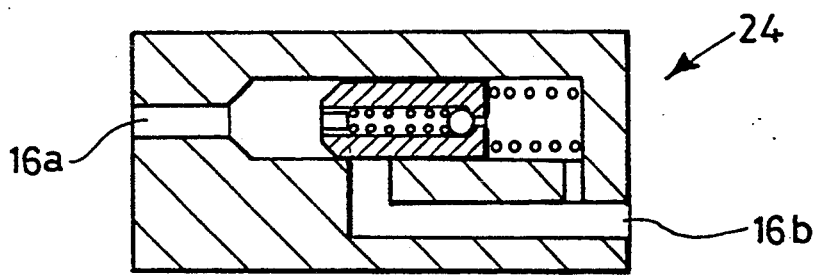
FIG. 4 shows the control valve member in a position after pressure generated by the fuel pump at the control valve inlet drops relative to pressure at the control valve outlet.

FIGS. 2, 3 and 4 show check valve 24 positioned in fuel line 16 with a fuel inlet 16a and an outlet 16b. A valve chamber 30 contains a linearly moveable valve member 32 which is urged towards the left hand end of chamber 30 by a return spring 34. A fuel branch passage 36 is provided between outlet 16b and chamber 30.

In use, when pump 14 starts to operate, pressure will build up in check valve inlet 16a, and this will cause valve member 32 to move to the right to the position shown in FIG. 3 where communication is opened between inlet 16a and outlet 16b. This is the normal fuel supply position. The pressure of the incoming fuel 16a will be working against the restoring force of the spring 34 and against the pressure exerted on the back of the valve member through the branch passage 36. While fuel is being supplied to fuel rail 18, valve 24 will remain in the position shown in FIG. 3.

However if the pressure generated by pump 14 in fuel line 18 drops so that the pressure at inlet 16a drops relative to the pressure of outlet 16b, then valve member 32 will move to the left to the position shown in FIG. 4, where it obscures outlet 16b and prevents fuel from fuel rail 18 from flowing in the opposite direction, back to tank 10. When this happens there is a trapped volume of fuel within fuel rail 18 and the upstream part of fuel line 16, which is in communication with valve member 32 through branch passage 36. The pressure under which this trapped volume is maintained may be greater than desired and, if this is the case, then the fluid pressure acting through passage 36 can be relieved by a further movement of valve member 32 to the left, and the size of chamber 30 is designed to allow this. The further movement of valve member 32 to the left beyond the position shown in FIG. 4 to the position shown in FIG. 2 will increase the volume occupied by the trapped fuel, and will thus reduce the pressure under which this trapped fuel is maintained. The valve member can therefore shuttle between its FIG. 2 and FIG. 4 positions to control the pressure of the trapped fuel behind valve member 32. The cross-section of branch passage 36 will be relatively small to allow flow through it.

The embodiment shown in FIGS. 2, 3 and 4 also includes an additional one-way valve consisting of a spring-loaded ball 38 which normally closes a narrow passage 40. Under most conditions this valve will remain closed but if an exceptionally high pressure should occur in fuel rail 18 and in fuel line outlet 16b and in branch passage 36, then ball 38 can lift off its seat to open passage 40 and to relieve this pressure.

Figure 5:
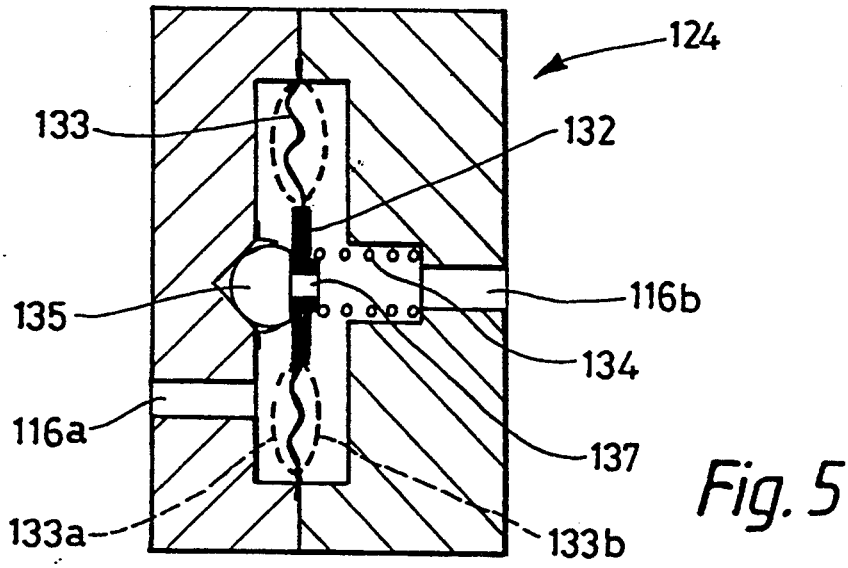
FIG. 5 is a cross-section through a second embodiment of the valve in accordance with the invention.

FIG. 5 shows an alternative embodiment where a check valve 124 has a housing with a fuel inlet 116a and a fuel outlet 116b. A valve member 132 is mounted at the center of a flexible diaphragm 133, and in the closed position shown in FIG. 5 the valve member 132 is pressed by a return spring 134 against a seating member 135 so that a hole 137 in the center of the valve member is closed. In this position there is no flow through the valve. However if the pressure at the inlet 116a rises, then the pressure acting on diaphragm 133 and on valve member 132 will overcome the pressure of spring 134 and valve member 132 will lift off seat 135 to allow flow through valve 124. Diaphragm 133 will take up position 133b under this condition. When, subsequently, the pressure at outlet 116b rises above that of inlet 116a, then valve member 132 will be pressed against valve seat 135 to close passage 137. If the pressure in outlet 116b is still above that of inlet 116a, then this pressure can be relieved by distention of diaphragm 133 which will change shape so that it takes up the position indicated in dotted lines at 133a. The resulting increase in volume on the right hand side of the diaphragm will relieve the pressure in fuel rail 18.

The embodiment shown in FIG. 5 does not include a one-way valve corresponding to valve 38, 40 in FIGS. 2, 3 and 4, but such a valve can be provided separately between check valve outlet 116b and fuel rail 18.

Figure 6:
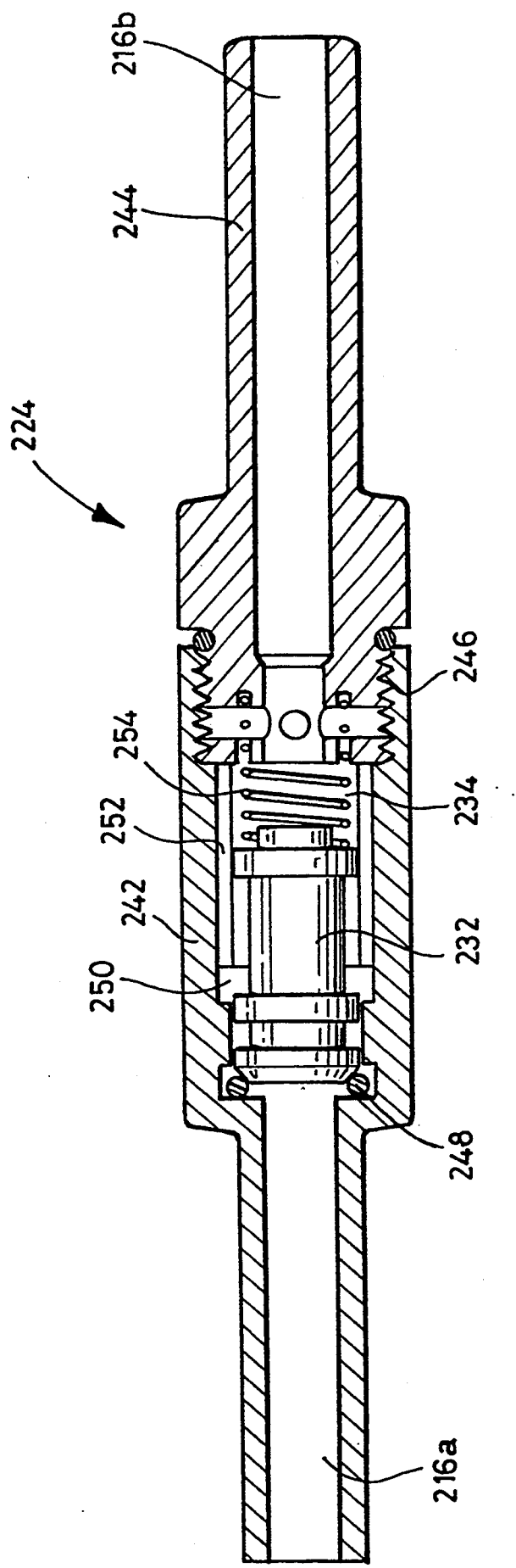
FIG. 6 is a cross-section of a practical embodiment of a check valve in accordance with the present invention which works on the same principle as the valve shown in FIGS. 2, 3 and 4, and is shown in the same position as that in FIG. 2.

FIG. 6 shows a check valve 224 which is a practical embodiment of a valve working on the same principle as the valve shown in FIGS. 2, 3 and 4. The valve has a housing made up of two parts 242 and 244, with these two parts being threaded together at 246. Valve 224 has an inlet 216a, an outlet 216b, a piston-like valve member 232 and a return spring 234. In the position shown in FIG. 6 (which corresponds to the position shown in FIG. 2) valve member 232 is in its left hand end position and sits against an O-ring 248 to close inlet 216a.

When the pressure in inlet 216a rises, valve member 232 is pushed to the right against the restoring force of spring 234. When valve member 232 is moved far enough to allow the fuel from inlet 216a to flow into land 250, then fuel will begin to flow from land 250 along axial grooves 252, into space 254 behind valve member 232 and out of valve 224 through outlet 216b.

If the pressure in inlet 216a drops and that in outlet 216b remains high, valve member 232 will move to the left to close communication between land 250 and inlet 216a. If there is a greater pressure at outlet 216b than at inlet 216a, then valve member 232 will move further to the left to allow the fuel in outlet 216b more space.

The nonreturn valve 38, 40 shown in FIGS. 2, 3 and 4 can be provided within valve member 232 or independently.

The check valve described thus allows a fuel injection system to be fed with fuel through a single fuel line 16 and through a single valve 24. The permissable movement of the valve member 32, 133, 232, beyond the "valve closed" position allows sufficient additional volume to be occupied by the trapped fuel to reduce the pressure of this fuel to within the desired limits.

Although the preferred embodiment of the present invention has been disclosed, various changes and modifications may be made without departing from the scope of the invention as set forth in the appended claims.

I claim:

1. A fuel delivery apparatus for an internal combustion engine, said apparatus comprising:
    a fuel reservoir;
    a pump;
    a fuel line along which fuel from said reservoir is pumped by said pump to said engine; and
    a check valve in said fuel line, comprising a valve body having a piston able to travel relative thereto in a cylindrical chamber formed therein to open and close a valve opening located intermediate between ends of said chamber so that a first end of said piston closes said valve before reaching an end of travel in said chamber, said check valve having an inlet in communication with said reservoir and said pump through said fuel line, and an outlet in communication with said engine through said fuel line, said valve being arranged to open to permit fuel flow to said engine when pressure in said inlet of said valve is greater than pressure in said outlet, and to close when the pressure differential is reversed, and wherein said said valve member is able to continue to move after having closed said valve opening in order to maintain the pressure of a fuel volume enclosed by a second end of said piston and an end of said chamber.

2. An apparatus according to claim 1 wherein said outlet of said valve has a reverse flow branch passage leading from said outlet to a valve chamber behind said valve member, said branch passage allowing fuel to enter said valve chamber to exert a pressure on said valve member.

3. An apparatus according to claim 2 wherein said branch passage has a flow cross-section smaller than the flow cross-section of said outlet.

4. An apparatus according to claim 1 wherein said piston includes a non-return valve operating in a direction opposite to that of said valve and adapted to open at a pressure substantially higher than an opening pressure of said valve.

5. An apparatus according claim 1 wherein said valve member comprises a closure member supported on a diaphragm, said diaphragm being free to distend after said closure member has closed on a valve seat, in order to maintain the pressure of a fuel volume enclosed between said valve member and said engine.

6. An apparatus according claim 1 comprising a single fuel line between said engine and said fuel tank, in which line said valve is fitted, and means for controlling operation of said pump in accordance with engine operating parameters such as throttle pedal position, fuel temperature or intake manifold vacuum.

7. A fuel delivery apparatus for an internal combustion engine, said apparatus comprising:
    a fuel reservoir;
    a pump;
    a fuel line along which fuel from said reservoir is pumped by said pump to said engine; and
    a check valve in said fuel line, comprising a valve body having a piston able to travel relative thereto in a cylindrical chamber formed therein to open and close a valve opening located intermediate between ends of said chamber so that said piston closes said valve before reaching an end of travel in said chamber, said check valve having an inlet in communication with said reservoir and said pump through said fuel line, and an outlet in communication with said engine through said fuel line, said valve being arranged to open to permit fuel flow to said engine when pressure in said inlet of said valve is greater than pressure in said outlet, and to close when the pressure differential is reversed, and wherein said said valve member is able to continue to move after having closed said valve opening in order to maintain the pressure of the fuel volume enclosed between said valve member and said engine, said valve member also having a non-return valve operating in a direction opposite to that of said check valve and adapted to open at a pressure substantially higher than an opening pressure of said valve.

* * * * *